(12) United States Patent
Hairston et al.

(10) Patent No.: US 9,067,492 B2
(45) Date of Patent: Jun. 30, 2015

(54) TRANSMISSION WITH INTEGRATED PTO INPUT GEAR DAMPER

(75) Inventors: Berron Hairston, Greenville, SC (US); Bradford White, Maumee, OH (US)

(73) Assignee: ZF Friedrichshafen AG, Friedrichshafen (DE)

( * ) Notice: Subject to any disclaimer, the term of this patent is extended or adjusted under 35 U.S.C. 154(b) by 284 days.

(21) Appl. No.: 13/471,884

(22) Filed: May 15, 2012

(65) Prior Publication Data

US 2013/0305862 A1 Nov. 21, 2013

(51) Int. Cl.
*B60K 17/28* (2006.01)
*F16F 15/12* (2006.01)
*F02B 67/04* (2006.01)

(52) U.S. Cl.
CPC .......... *B60K 17/28* (2013.01); *Y10T 74/19623* (2015.01); *F02B 67/04* (2013.01); *F16F 15/12* (2013.01)

(58) Field of Classification Search
CPC ....................................................... B60K 17/28
USPC ....................................................... 74/11, 409
See application file for complete search history.

(56) References Cited

U.S. PATENT DOCUMENTS 6,267,705 B1  7/2001  Rose et al.
2009/0211254 A1  8/2009  Bartosch et al.

FOREIGN PATENT DOCUMENTS

JP          2006103634 A  *  4/2006

* cited by examiner

*Primary Examiner* — Keith Frisby
(74) *Attorney, Agent, or Firm* — Brinks Gilson & Lione

(57) ABSTRACT

A power take-off unit ("PTO") may include a damper to reduce noise while the PTO is operating at low torque or at low RPM. The damper may also be located in the transmission before the PTO driver gear. A method may be used to systematically measure the frequency and/or amplitude of the vibrations that cause noise and to adjust the damping constant of a damper to reduce the noise.

9 Claims, 6 Drawing Sheets

TRANSMISSION WITH INTEGRATED PTO INPUT GEAR DAMPER

BACKGROUND OF THE INVENTION

1. Field of the Invention

The invention relates to transmissions that use power-take off units ("PTOs"). In particular, the invention relates to transmissions that interface with a PTO using a PTO drive gear.

2. Related Art

PTOs provide a convenient means to power accessories or secondary functions of a vehicle or other powered equipment. PTOs may be used with vehicles of all types, including, but not limited to, automobiles, trucks, marine vessels, or airplanes. A PTO may also be used with an industrial engine. A PTO may interface directly with an engine, or may interface with a transmission that is used with an engine. Generally, the output of a PTO is a shaft to which other devices or equipment can be attached and powered. For example, the output of a PTO may be used to power a hydraulic pump, winch, or dump truck bed lift. PTOs may be driven by any torque carrying shaft in the engine, transmission, or vehicle.

A common arrangement is an engine-driven PTO arrangement where the PTO receives an input torque from the engine crankshaft, or a component connected to the engine crankshaft. A common connection point for engine-driven PTO applications is the torque converter impeller, which may be directly connected to the engine crankshaft through a connection to the engine flex-plate.

Typically, in engine-driven PTO applications, excessive gear noises are generated at the interface between the drive gear, which may be a gear in a transmission, and the PTO input gear due to backlash. Backlash may be described as the amount of clearance or space between mating components such as gears. Components may generate noise due to their backlash, particularly when the components are unloaded. Noise typically occurs when the engine is operating at low revolutions per minute ("RPM") due to torsional vibrations from the engine that excites the gear mesh of the drive gear and PTO input gear. Noise may also occur during PTO operation when the PTO is operating with a low torque load at the output side of PTO. This noise results in decreased efficiency and may be irritable or harmful to the operator of the vehicle or equipment that is driven by the PTO. Thus, there is a need for a PTO that offers reduced noise during operation, particularly when the PTO is operating with a low load or at low RPMs.

SUMMARY OF THE INVENTION

The descriptions below include apparatuses and methods for reducing the operation noise of PTOs. A transmission may include a damper at a point along the torque path from the transmission PTO output gear to the PTO output. The damper absorbs vibrations and rattling in the PTO components and correspondingly may decrease the noise caused by the backlash of the gears or other components along the torque path.

According to one embodiment of the invention, a damped system comprises a transmission; a damper; a drive gear; a first shaft configured to transmit torque from the transmission to the damper; and a second shaft configured to transmit torque from the damper to the drive gear.

According to another embodiment of the invention, a power take-off unit comprises an input gear an input shaft connected to the input gear; an output shaft coupled to the input shaft; and a damper coupled between the input shaft and the output shaft.

According to another embodiment of the invention, a method of operating a power take-off unit comprises the steps of receiving torque at an input shaft; and damping the PTO input shaft with a damper.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The embodiments described below may be more fully understood by reading the following description in conjunction with the drawings, in which.

DETAILED DESCRIPTION

The described embodiments may alleviate the excessive noise generated when operating a PTO, particularly at low torque loads and/or at low RPMs. A vehicle transmission that integrates or interfaces with a PTO may include a damper to reduce noise generated by the transmission/PTO interface or in the PTO due to low RPM operation of the PTO, or due to backlash. Alternatively, the damper may be located in the PTO. The disclosed embodiments may be used with engine- or rear-driven PTOs.

Figure 1:
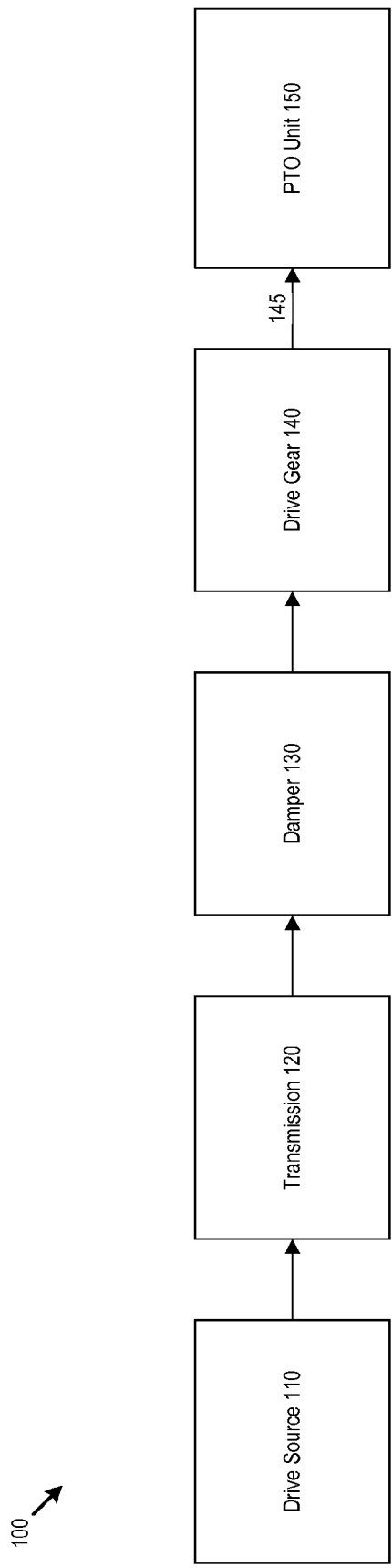
FIG. 1 is a block diagram of a damped system according to one embodiment of the invention.

FIG. 1 illustrates a block diagram of damped system 100 according to one embodiment of the invention. Drive source 110 may be an engine, e.g., an internal combustion or diesel engine. Drive source 110 is coupled to transmission 120, which may be, for example, a manual or automotive transmission. Transmission 120 is coupled with damper 130, which may be a fluid damper, spring damper, or another type of damper.

Damper 130 may dampen the vibrations in damped system 100 by absorbing, for example, torsional or other mechanical vibrations at interface 145 between drive gear 140 and PTO unit 150. Typically, interface 145 is a gear mesh. The damping effect of damper 130 may reduce the excessive noise that may result due to these vibrations.

Damper 130 is coupled with drive gear 140, which is further coupled with PTO unit 150. PTO unit 150 may output a torque to drive a torque load (not shown).

Figure 2:
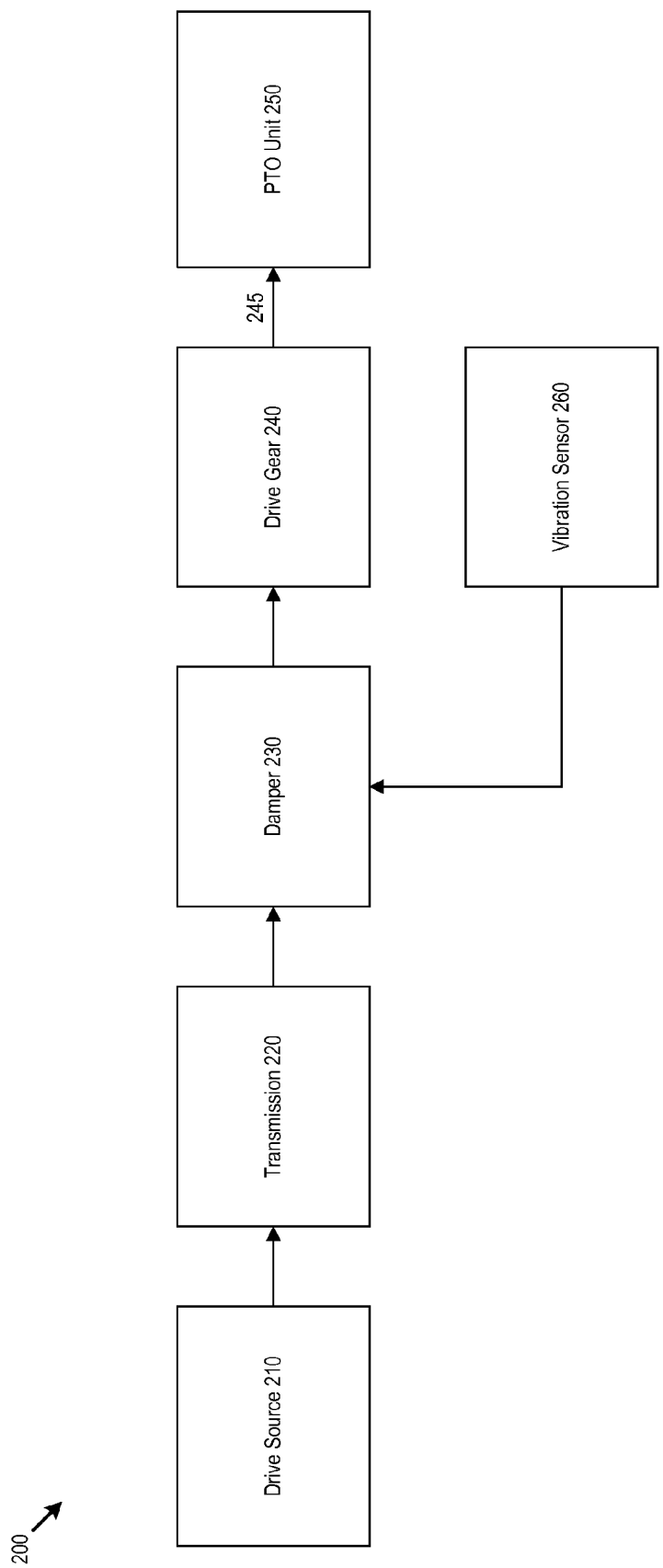
FIG. 2 is a block diagram of a damped system according to one embodiment of the invention.

FIG. 2 illustrates a block diagram of damped system 200 according to another embodiment of the invention. Vibration sensor 260 has been added to damped system 100. Vibration sensor 260 may be an electromechanical, piezoelectric, or mechanical device that detects vibrations and provides a signal that represents the frequency and/or amplitude of the mechanical vibrations at interface 245 or elsewhere in damped system 200.

The output of vibration sensor 260 is sent to damper 230. Damper 230 may have an adjustable frequency at which it most efficiently dampens vibrations. For example, damper 230 may be a spring damper or fluid damper with an adjustable damping constant. The damping constant may be adjusted by the user of damped system 200, or may be adjusted automatically by a processor based on a signal from vibration sensor 260. Alternatively, damper 230 may be self-adjusting based on a signal from vibration sensor 260. Damper 230 and vibration sensor 260 may form a regulation loop that may search for particular vibrations and dampen them. For example, the regulation loop may search for vibrations in the frequency range of human hearing, i.e., 10 Hz to 20 kHz.

Figure 3:
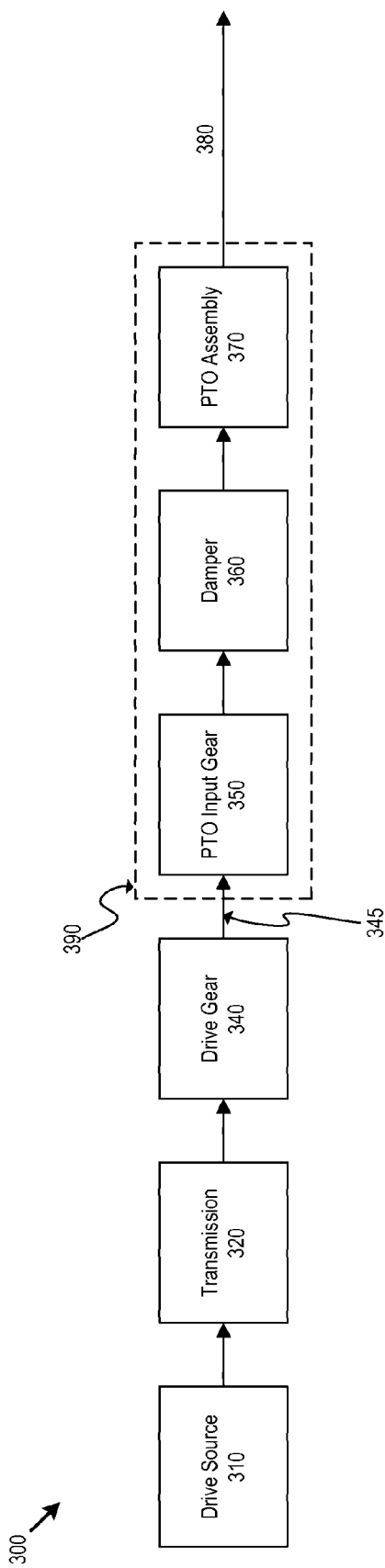
FIG. 3 is a block diagram of a damped system according to one embodiment of the invention.

FIG. 3 illustrates a block diagram of damped system 300 according to another embodiment of the invention. In damped system 300, damper 360 is a component of PTO 390. Damper 360 may dampen the vibrations at interface 345 between drive gear 340 and PTO input gear 350. Interface 345 is typically, but is not limited to, a gear mesh. Damper 360 transmits torque to PTO assembly 370, which transmits torque to PTO output shaft 380. PTO assembly 370 may comprise a combination of gears, clutches, and shafts, or any other components or combinations of components that transmit torque from damper 360 to PTO output shaft 380. PTO output shaft 380 may interface with a torque load, such as a pump or lift.

Figure 4:
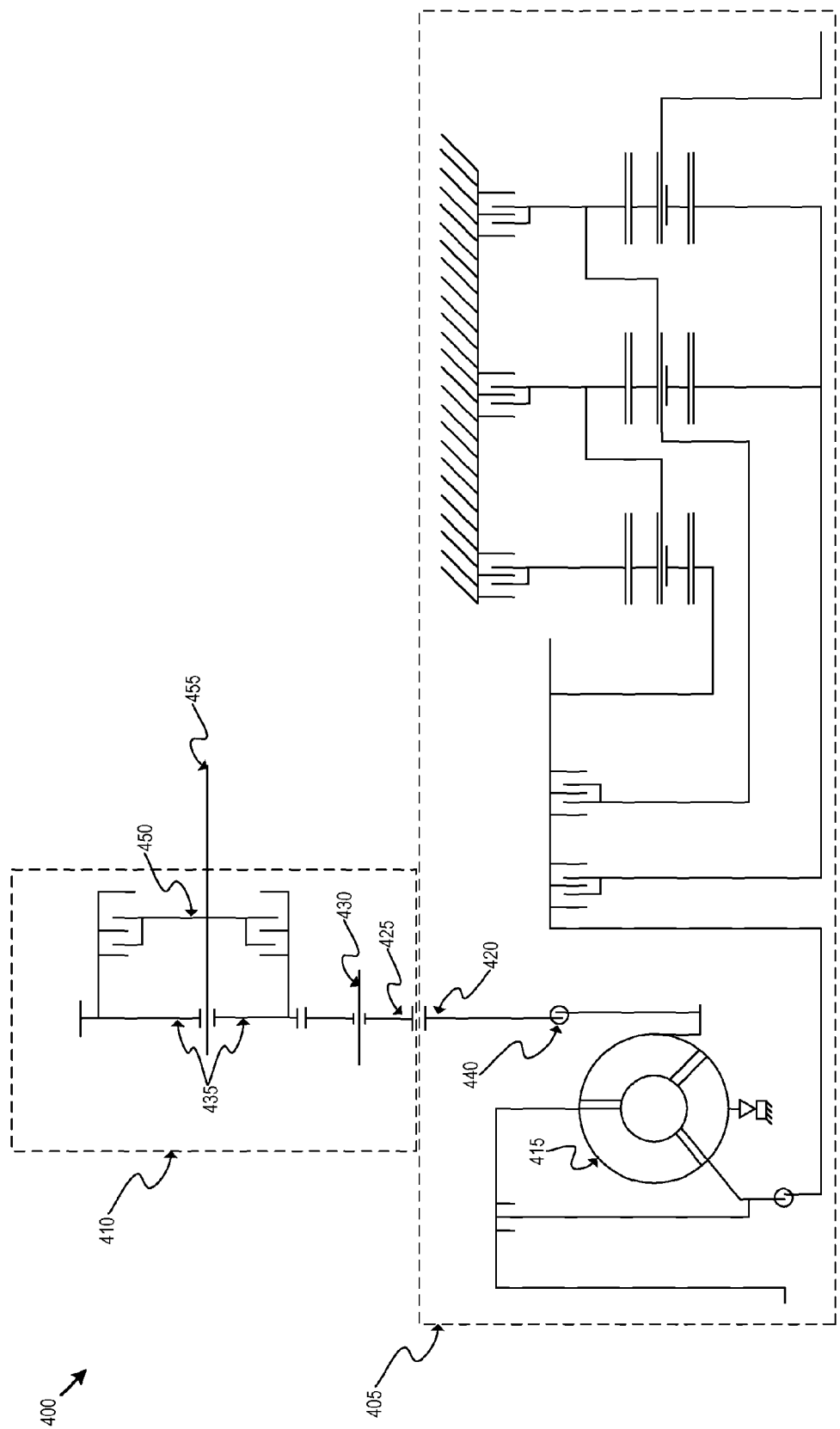
FIG. 4 a schematic diagram of a transmission and a PTO that includes a damper according to another embodiment of the invention.

FIG. 4 illustrates a schematic diagram of system 400 according to one embodiment of the invention. System 400 includes transmission 405 and PTO 410. Transmission 405 includes torque converter 415, and may be an automatic transmission. Alternatively, transmission 405 may be a manual transmission. Transmission 405 further includes damper 440, which may be, for example, a fluid or spring damper. Damper 440 may also be an adjustable damper with an adjustable damping constant. Damper 440 transmits torque from transmission 405 to drive gear 420. Damper 440 may, however, dampen vibrations that are created when transmission 405 is operating at low RPMs, or due to backlash between drive gear 420 and input gear 425.

Drive gear 420 transmits torque to input gear 425. Typically, the interface of drive gear 420 and input gear 425 is a gear mesh. Input gear 425 transmits torque to idler shaft 430. Idler shaft 430 may advantageously transmit torque from one end of a vehicle to another, or may reverse the direction in which output shaft 455 rotates. Idler shaft 430 transmits torque to clutch pack 450 via gear 435. If clutch pack 450 is not engaged, then torque is not transmitted to output shaft 455. Damper 440 may provide for reduced noise while operating PTO 410 with a low torque load or while transmission 405 is operating at low RPMs.

Figure 5:
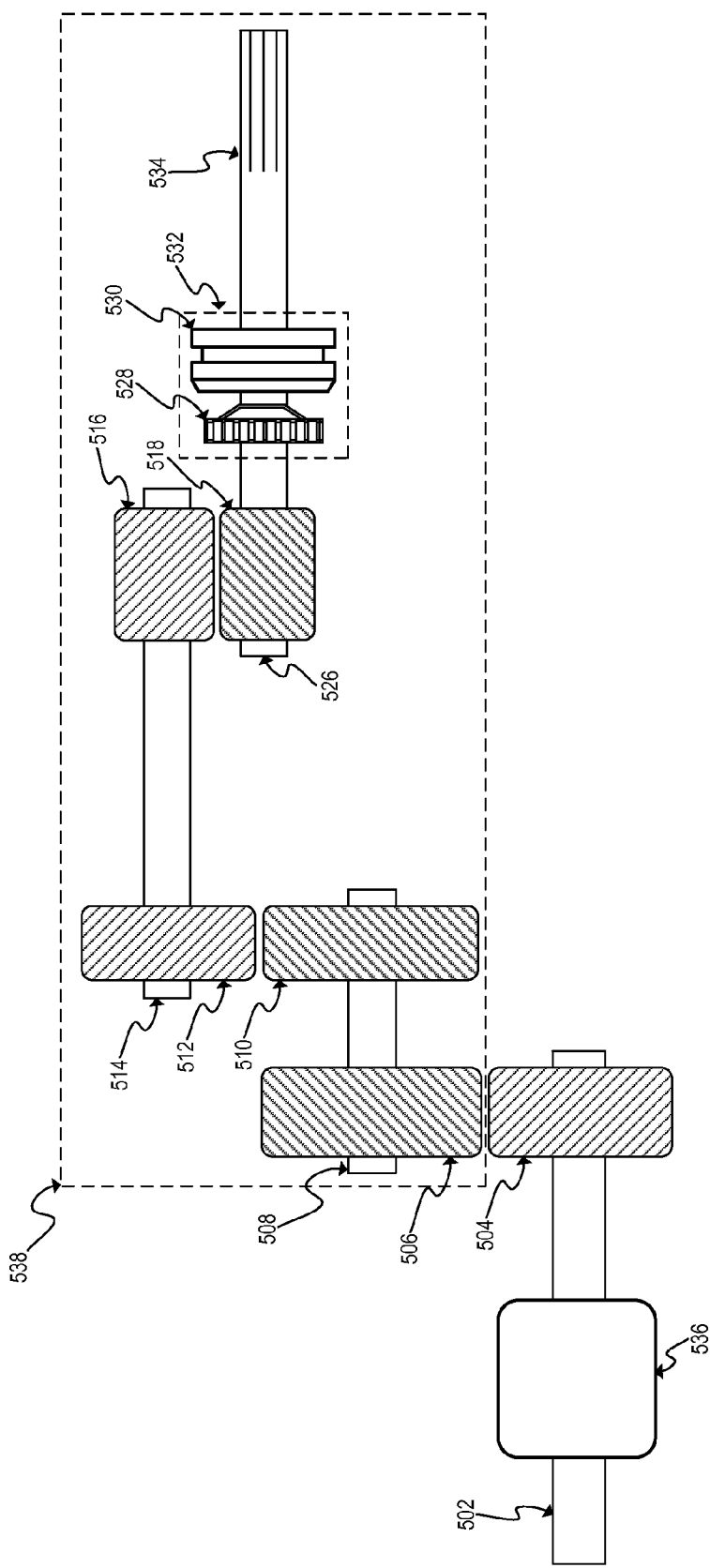
FIG. 5 is a mechanical illustration of a PTO equipped with a damper according to another embodiment of the invention.

FIG. 5 depicts a mechanical illustration according to another embodiment of the invention. Shaft 502 may be the output shaft of a drive source or a shaft in a transmission that is directly or indirectly coupled to a drive source. Shaft 502 is connected to damper 536, which may advantageously dampen the vibrations of the drive source. These vibrations may cause the gear mesh between drive gear 504 and input gear 506 to generate excessive noise, particularly when the transmission is operating at low RPMs or when PTO 538 is operating with a low torque load coupled to output shaft 534. Damper 536 transmits torque to drive gear 504, which transmits torque to input gear 506. Input gear 506 is connected to shaft 508, which is also connected to gear 510. Idler gear 512 meshes with gear 510. Idler gear 512 is connected with idler gear shaft 514, which is also connected with gear 516, which meshes with gear 518. Gear 518 is connected to shaft 526, which is connected to first side 528 of clutch 532. Second side 530 selectively engages with first side 528 of clutch 532 to affect a torque transfer from shaft 526 to output shaft 534. When first side 528 is not engaged with second side 530, no torque is transferred from shaft 526 to output shaft 534. The operator of PTO 538 may control the configuration of clutch 532 to selectively transmit torque to output shaft 534 when operating PTO 538. Clutch 532 may be controlled electrically, mechanically, hydraulically, or pneumatically. PTO 538 may receive an input signal from a switch or user interface to provide the user of PTO 538 with a means of changing the configuration of clutch 532.

Output shaft 534 may optionally include splines as depicted in FIG. 5 for interfacing with the PTO load (not shown). A splined output shaft may be used where the PTO load includes a hollow shaft with groves that may mesh with and engage the splines on output shaft 534.

Figure 6:
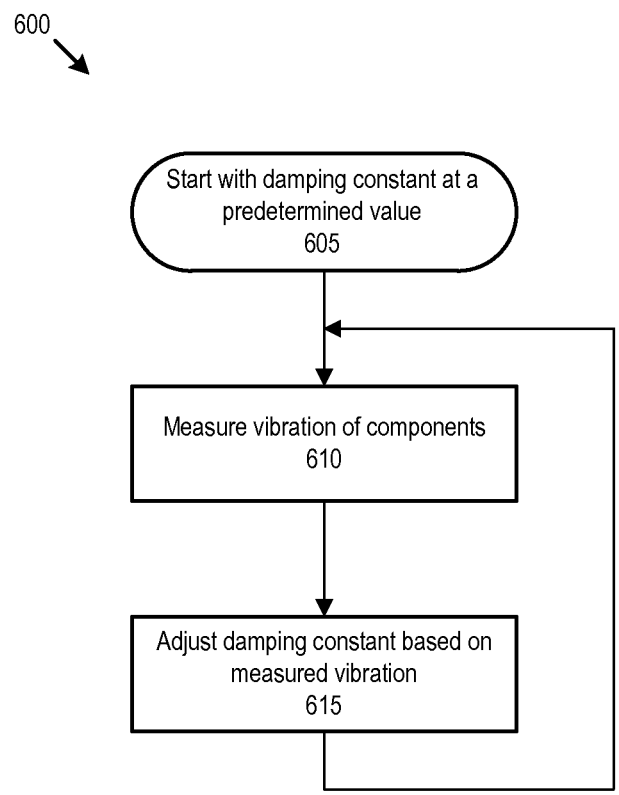
FIG. 6 is a flow diagram of a method for operating a PTO equipped with a damper according to another embodiment of the invention.

FIG. 6 illustrates method 600 for damping vibrations according to one embodiment of the invention. Method 600 begins with step 605 in which a damping constant of an adjustable damper is set to a predetermined value. The predetermined value may be based on a value stored during a previous execution of method 600 or may be based on a vibration frequency known to result in noise.

In step 610, a measurement is made of the frequency and/or amplitude of the vibrations of one or more components of a transmission or PTO. In step 615, the damping constant of the adjustable damper is adjusted based on the measurement of step 610. A microprocessor located in a vibration sensor may record measurements of the vibration amplitude over a range of frequencies. The range of frequencies may be the range of human hearing, i.e., 10 Hz to 20 kHz, or may be a smaller or larger range of frequencies. The microprocessor, or some other component in communication with the vibration sensor, may adjust the damping constant of the adjustable damper to dampen the vibrations occurring at the frequency where the maximum amplitude vibrations are located.

Method 600 returns to step 610, and a new measurement is made. Method 600 may repeat in this manner to continuously dampen the vibrations that may cause the most irritation or harm, such as at frequencies within the range of human hearing, i.e., 10 Hz to 20 kHz. Steps 605, 610, and 615 of method 600 may be implemented as software or firmware executable by a processor, or as hardware.

Coupling of the components in the disclosed embodiments may be implemented by mechanical, electrical, hydraulic, or pneumatic means. The gears used in the disclosed embodiments may include spur gears, bevel gears, worm gears, hypoid gears, planetary gears, herringbone gears, and helical gears. The use of helical gears may be advantageous because of their high efficiency and low noise. Methods or processes may be implemented, for example, using a processor and/or instructions or programs stored in a memory. Specific components of the disclosed embodiments may include additional or different components. A processor may be implemented as a microprocessor, microcontroller, application specific integrated circuit (ASIC), discrete logic, or a combination of other types of circuits or logic. Similarly, memories may be DRAM, SRAM, Flash, or any other type of memory. Parameters, databases, and other data structures may be separately stored and managed, may be incorporated into a single memory or database, or may be logically and physically organized in many different ways. Programs or instruction sets may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A damped transmission for connecting to a power take-off unit, the damped transmission comprising:
    a damper;
    a drive gear;
    a torque converter;
    a first shaft configured to transmit torque from the torque converter to the damper; and
    a second shaft configured to transmit torque from the damper to the drive gear, wherein the drive gear is configured to connect with the power take-off unit.

2. The damped transmission of claim 1, wherein the damper is
    a fluid damper.

3. The damped transmission of claim 1,
    wherein the damper is a spring damper and the spring damper has a predetermined spring constant, wherein the predetermined spring constant is configured to dampen vibrations of an engine that is operating at approximately 1000 RPMs and is coupled to the damped transmission.

4. The damped transmission of claim 1, wherein the damped transmission is an automatic transmission.

5. The damped transmission of claim 1, wherein the power take-off unit comprises an input gear connected to an input shaft, wherein the input gear is connected with the drive gear of the damped transmission.

6. The damped transmission of claim 5, wherein the power take-off unit further comprises an idler shaft and an output shaft, wherein the input shaft and the output shaft are coupled in part by a clutch configured to selectively transmit torque from the input shaft via the idler shaft to the output shaft.

7. The damped transmission of claim 1 further comprising a vibration sensor configured to detect vibrations of the transmission.

8. The damped transmission of claim 7, wherein the vibration sensor is in communication with the damper.

9. The damped transmission of claim 8, wherein a damping constant of the damper is adjusted based on a signal received from the vibration sensor.

* * * * *